United States Patent [19]
Gartside, III

[11] Patent Number: 4,645,298
[45] Date of Patent: Feb. 24, 1987

[54] OPTICAL FIBER CABLE

[75] Inventor: Charles H. Gartside, III, Lilburn, Ga.

[73] Assignee: AT&T Bell Laboratories, Murray Hill, N.J.

[21] Appl. No.: 518,145

[22] Filed: Jul. 28, 1983

[51] Int. Cl.$^4$ .............................. G02B 6/36
[52] U.S. Cl. .................................. 350/96.23
[58] Field of Search ......................... 350/96.23

[56] References Cited

U.S. PATENT DOCUMENTS

| | | | |
|---|---|---|---|
| 4,037,922 | 7/1977 | Claypoole | 350/96 B |
| 4,037,923 | 7/1977 | Beal | 350/96.23 |
| 4,072,398 | 2/1978 | Larsen et al. | 350/96.23 |
| 4,076,382 | 2/1978 | Oestreich | 350/96.23 |
| 4,078,853 | 3/1978 | Kempf et al. | 350/96.23 |
| 4,097,119 | 6/1978 | Kumamaru et al. | 350/96.23 |
| 4,141,622 | 2/1979 | Beal | 350/96.23 |
| 4,141,623 | 2/1979 | Dubost et al. | 350/96.23 |
| 4,143,942 | 3/1979 | Anderson | 350/96.23 |
| 4,153,332 | 5/1979 | Longoni | 350/96.23 |
| 4,156,104 | 5/1979 | Mondello | 174/70 R |
| 4,230,395 | 10/1980 | Dean et al. | 350/96.23 |
| 4,241,979 | 12/1980 | Gagen et al. | 350/96.23 |
| 4,318,588 | 3/1982 | Zeidler et al. | 350/96.23 |
| 4,342,500 | 8/1982 | Oestreich et al. | 350/96.23 |
| 4,381,140 | 4/1983 | van der Hoek et al. | 350/96.23 |
| 4,464,401 | 3/1982 | Sabia | 350/96.23 |

OTHER PUBLICATIONS

"Characteristics of Jelly-Filled Optical Cables", by Horima et al., Journal of Optical Communications, Aug. 19, 1980.
News Release of SIECOR/Optical Cable (6 pages).
News Release of SIECOR/Optical Cable (8 pages).
"Mechanical/Environmental Performance of Rugged Lightweight Fiber Optic Cables for Tactical Field Applications", *Proceedings*, 27th International Wire & Cable Symposium, 1978, pp. 370–377, by R. J. Freiburger et al.
"Broadbandwidth Optical Fiber Cable for 1.3 μm, 24km Non-Repeater Communication System", *International Wire & Cable Proceedings*, 1981, pp. 133–137, by S. Kubota et al.
"Fabrication and Test of Optical Fibre Cables for Military and PTT Applications", *International Wire & Cable Symposium Proceedings*, 1980, pp. 306–311, by W. Schmidt et al.

*Primary Examiner*—William L. Sikes
*Assistant Examiner*—Akm E. Ullah
*Attorney, Agent, or Firm*—James H. Fox

[57] ABSTRACT

An optical fiber cable comprises one or more "units" surrounded by a sheath. Each unit comprises a dielectric central strength member, a smooth cushion layer thereon, and one or more optical fibers helically wrapped thereon. A tube surrounds this structure, with the space therebetween optionally filled with a waterproofing gel that has a low modulus over a wide temperature range. The tube is made of a material (typically PVC) that obtains a low modulus during cooling after extrusion so that substantially no compressive stresses are transmitted to the optical fibers. In an alternate embodiment, the optical fibers do no lay directly on the cushion layer but "float" in the waterproofing gel. In another embodiment, a spacer fiber of larger diameter than the optical fibers provides for clearance between the tube and the optical fibers. The resulting structure provides for ease of manufacture and low microbending losses for the optical fibers over a wide temperature range.

20 Claims, 7 Drawing Figures

OPTICAL FIBER CABLE

BACKGROUND OF THE INVENTION

1. Field of the Invention

The present invention concerns an optical fiber cable.

2. Description of the Prior Art

An optical fiber cable provides means for protecting one or more optical fibers therein, both during the manufacturing process and during subsequent installation and service conditions. The design of the cable must prevent excess tensile load from being supported by the optical fibers; otherwise static fatigue over a period of time can lead to breakage of the optical fibers. In addition, lateral loads must be resisted to provide for crush resistance of the cable. It is also desirable to provide for waterproofing of the cable. In some designs, this takes the form of an air core, which can be pressurized with a dry gas to prevent water entry. More recently, a trend has developed towards so-called "filled cables" wherein a filling compound is located in the interstices of the cable to prevent water entry and migration. One requirement that is of great importance in optical fiber cables is that significant compressive strains be avoided on the optical fibers themselves during the manufacturing process or during the installation and service life of the cable. Significant compressive forces can cause buckling of the optical fibers, resulting in increased losses due to microbending of the fibers.

It is apparent that the above considerations place significant constraints on the choice of materials, designs, and manufacturing processes required to simultaneously meet the above requirements. It is desirable to obtain cable designs that provide protection against a variety of external forces and influences, thereby retaining the low loss characteristics of the optical fibers therein.

SUMMARY OF THE INVENTION

I have invented an optical fiber cable comprising one or more units located within a cable sheath. At least one unit comprises a longitudinal dielectric strength member having thereon a substantially smooth buffer layer comprising rubber or other polymeric material. One or more optical fibers are helically arranged around the buffer layer. The unit further comprises a tube of polymeric material formed around, but not in contact with, the optical fibers. The interstices within the tube are optionally filled with a waterproofing compound, typically a gel. The material of the polymeric tube is chosen to have a modulus that is sufficiently low so that when extruded around the optical fibers at an elevated temperature and cooled subsequently to room temperature, no substantial compressive stress is induced upon the optical fibers. In one embodiment, one or more spacer cords having a diameter larger than the optical fibers are also helically disposed around the longitudinal strength member. The spacer cord maintains a clearance between the longitudinal strength member and the tube, substantially preventing the optical fibers from contacting the tube. The units typically include only dielectric material. One or more of the above units are surrounded by a sheath combining additional strength members or other layers, as desired. An inventive technique for obtaining a clearance between the optical fibers and the central strength member is shown, whereby a differential strain is initially applied therebetween.

DETAILED DESCRIPTION

Figure 1:
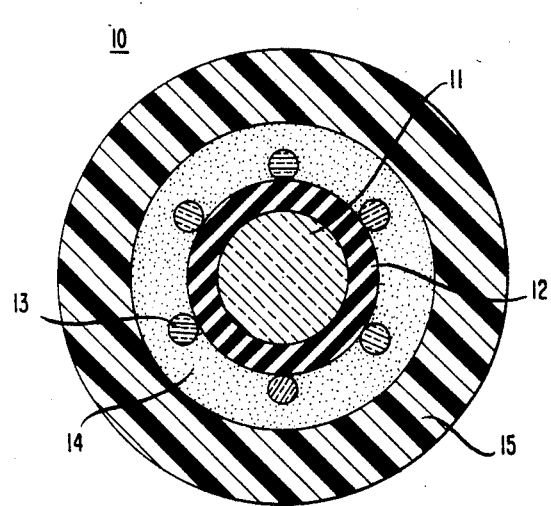
FIG. 1 shows a single unit according to the present invention.

The following detailed description concerns an optical fiber cable. In the present invention, the various requirements of an optical fiber cable for protecting one or more optical fibers therein are achieved by the inventive unit design. Referring to FIG. 1, the basic unit 10 comprises a dielectric longitudinal strength member 11, also referred to as a "central" strength member herein, as it is typically located in the center of the unit. A dielectric material is desirable to prevent arcing within the unit in the case of lightning strikes. As used herein, the term "dielectric" means a material having a volume resistivity of greater than 1 ohm-cm. Materials having a resistivity of greater than $10^5$ ohm-cm are most typically used for the central strength member. Fiberglass is advantageously used as a strength member, due to low cost and a coefficient of expansion that substantially matches that of the optical fibers. The fiberglass is typically impregnated with a thermally cured epoxy or other matrix material. Kevlar (trademark of E. I. Dupont for polyaramid fiber) can also be used. For an example of a suitable strength member impregnated with an ultraviolet-curable matrix material, see U.S. Pat. No. 4,479,984 coassigned with the present invention.

A buffer layer 12 on the strength member provides a cushion for the optical fibers 13 that are helically wrapped around the buffer layer. In the present design, the buffer layer is substantially smooth; that is, not grooved. This significantly eases production problems that can arise from designs where it is necessary to place each fiber within a groove during a high-speed production process. Surrounding the optical fibers and central strength member is a tube 15, also referred to as a "unit tube" herein. The unit tube is made of a material having a suitably low modulus, as discussed further below.

A waterproofing material 14, also referred to as a "filling compound" in the art, is optionally contained within the unit tube, filling the interstices therein. The filling compound is chosen to have a modulus of less than 5 pounds per square inch over the temperature range of −40° F. to 170° F. Suitable compositions comprise a mixture of a napthenic or paraffinic oil, a styrene-ethylene-butylene-styrene block copolymer, and a thermal stabilizer; see U.S. patent application Ser. No. 362,603, filed now U.S. Pat. No. 4,464,013 Mar. 29, 1982, and coassigned with the present invention. The unit tube 15 is chosen of a material that sufficiently relaxes after extrusion so that substantially no compressive longitudinal forces are transmitted to the optical fibers through the filling compound in the manufacturing process or in service. Materials suitable for this purpose include poly(vinyl chloride) (PVC) or copolymers or higher-order polymers thereof. A presently preferred material is an ethylenevinyl acetate (EVA) copolymer that is grafted onto PVC. However, other materials can be chosen that obtain a suitably low modulus upon cooling after extrusion at an elevated temperature, such that substantially no compressive stress is transmitted to the optical fibers.

It has been found satisfactory to choose a tube material that has a shear modulus of less than 500 pounds per square inch at a temperature of 100° C., measured at a frequency of 1 radian per second. The measurement of modulus as a function of temperature and shear rate can be accomplished by an "oscillatory mechanical tester," according to methods known in the rheology art. This requirement has been found to substantially avoid processing-induced residual stresses. The subsequent relaxation of these stresses during the service life of the cable can result in dimensional changes in the tube, and microbending losses in the optical fibers. An advantage of the present design is that the fibers can have a coating thickness of less than 0.005 inch (0.13 millimeter). This is because the present cable structure provides adequate protection against microbending losses that can otherwise require significantly thicker optical fiber coatings, as is the case in certain prior art cable designs.

Figure 2:
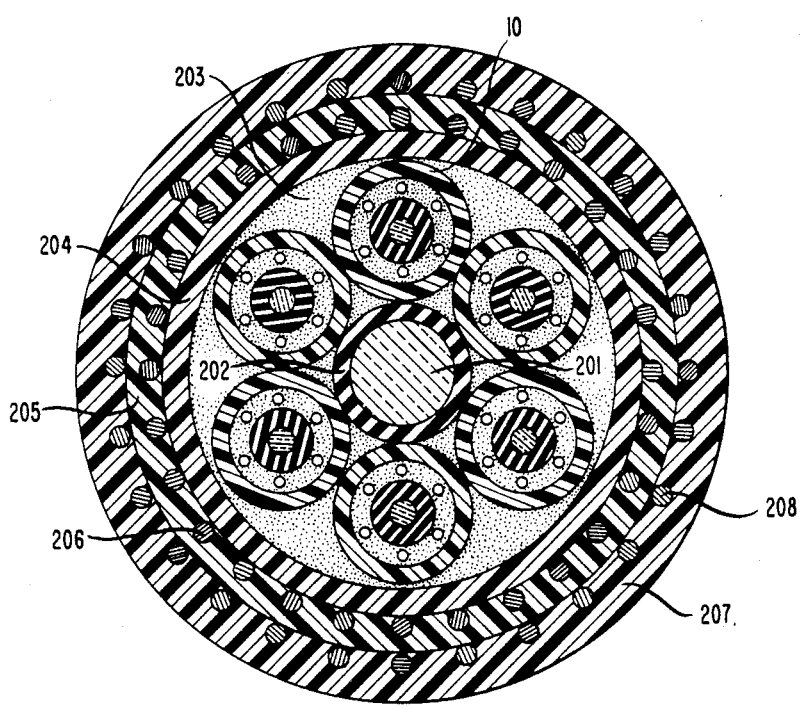
FIG. 2 shows six of the inventive units combined within a sheath surrounding a core having a central strength member.

One or more of the above units can be included in the core of the cable having a wide variety of sheaths thereon. Typically, from one to six units are included in the core of the cable, with from one to twenty-four single-mode or multimode fibers being helically stranded within a given unit. For example, referring to FIG. 2, a six-unit design is shown wherein a glass-epoxy strength member 201 is at the center of the core. This central strength member is coated with a buffer layer 202, which is typically of the same material (e.g., PVC) as the unit tube 15. The individual units 10 are as noted above, and the space between the units within the core is also filled with a waterproofing gel compound 203. The cable of FIG. 2 further comprises a polyethylene core tube 204, a first high-density polyethylene sheath 205 having helically wrapped steel wires 206 embedded therein, and a second high-density polyethylene sheath 207 having a second layer of stainless steel wires 208 helically wrapped in an opposite direction as the first layer, providing a torque-balanced design. This sheath design is substantially similar to that described in U.S. Pat. No. 4,241,979, coassigned with the present invention.

Figure 3:
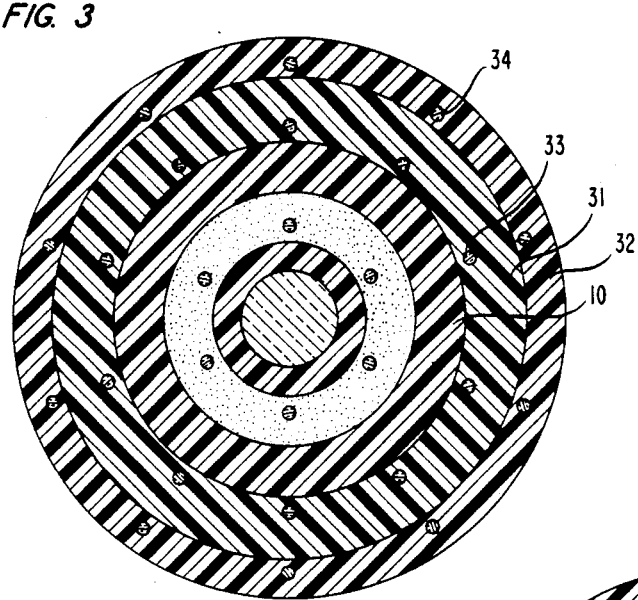
FIG. 3 shows a single unit combined within a sheath having two layers of strength members.
Figure 4:
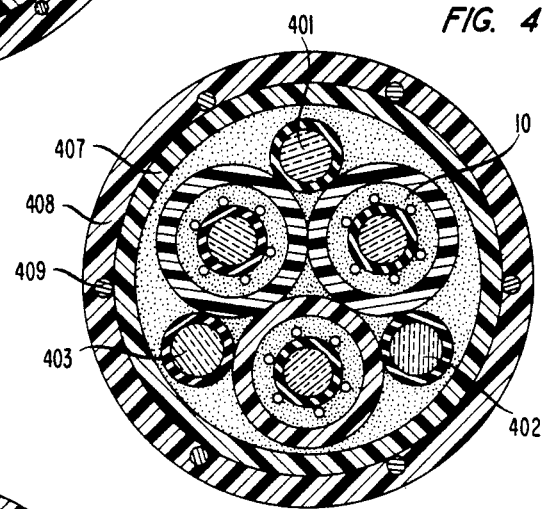
FIG. 4 shows three units located within a sheath having a single layer of strength members.
Figure 5:
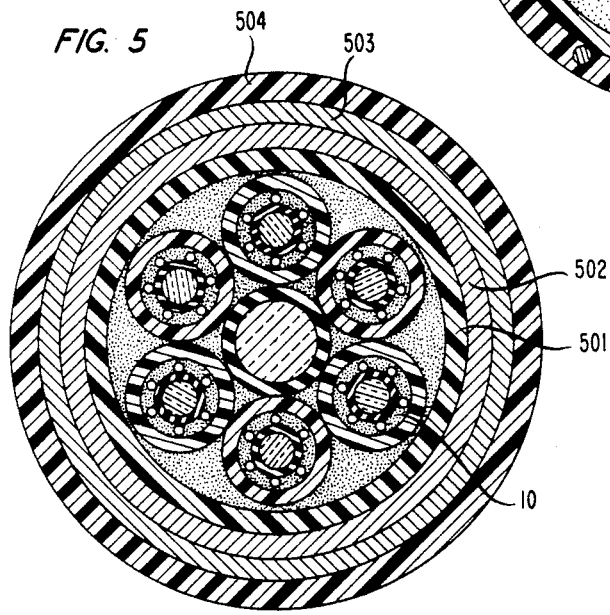
FIG. 5 shows a six-unit cable having a rodent and lightning protection sheath.

A single-unit cable is shown in FIG. 3, wherein a single of the above-noted units 10 is located in the center of a sheath comprising two layers (31, 32) of high-density polyethylene having steel wires (33, 34) embedded therein, as noted above. FIG. 4 shows a three-unit design wherein additional strength members 401, 402, and 403, each being epoxy-impregnated fiberglass or other dielectric material, are included in the cable core along with the units. A polyethylene core tube 407 surrounds the units, with a waterproofing gel filling the interstices, as above. The sheath comprises a single-layer, high-density polyethylene layer 408 having steel wires 409 embedded therein. In the above-noted sheath designs, it should be appreciated that other strength members, for example fiberglass or impregnated fiberglass, can also serve as the longitudinal strength members, instead of stainless steel. The fiberglass has the advantage of resistance to lightning strikes, and can provide for an all-dielectric cable design. Still another configuration is shown in FIG. 5, wherein six units are included in the core, and a polyethylene core tube 501 surrounds the core as before. The sheath comprises a corrugated aluminum layer 502, and a corrugated stainless steel layer 503 which provide for substantial rodent and lightning protection of the cable. A bonded high-density polyethylene jacket 504 surrounds the entire structure. Still other sheath designs are possible.

The above-noted principles will be more fully illustrated by means of the following Example.

EXAMPLE

Referring to FIG. 1, a unit 10 was formed comprising an S-glass strength member 11 that was impregnated with a thermally curved epoxy material to form a composite having a diameter of 0.056 inch (1.42 millimeters) and having a tensile stiffness of 200 pounds per percent elongation. This was coated with a buffer layer 12 of Kraton G (trademark of Shell Chemical Company) 7705 rubber to a thickness of approximately 0.01 inch (0.25 millimeter), producing an overall diameter of approximately 0.075 inch (1.9 millimeters). The Kraton material has a Shore A (D-2240) hardness of 45 and a modulus at 300 percent elongation of 300 pounds per square inch. Around each buffered strength member were helically wound six single-mode optical fibers 13 having an approximately 8 micrometer core and an outside diameter of 125 micrometers. Each fiber had a dual-layer coating, with the first layer being a relatively low modulus, hot-melt material and the outer layer being an ultraviolet-curable urethane acrylate. The outer diameter of each coated fiber was approximately 0.009 inch (240 micrometers). The pitch of the helical wrap was approximately 4 inches, and the fibers were wound with a planetary strander in order to eliminate torsion on the fibers. Around this structure were coextruded a waterproofing gel 14 and a PVC tube 15. The waterproofing gel, referred to as a "filling compound," had a composition as indicated in Table I.

TABLE I

| Filling Gel Composition | |
|---|---|
| Components | (Parts by Weight) |
| Styrene-ethylene-butylene block copolymer (Kraton G 1650) | 7 |
| Mineral oil (napthenic) (Drakeol 35) | 93 |
| Antioxidant (Irganox 1035) | 0.2 |

This filling gel had a modulus of approximately 2.3 pounds per square inch at −40° F., decreasing above that temperature to approximately 0.05 pound per square inch at 70° F. and less at higher temperatures. The tube 15 had a composition as indicated in Table II.

TABLE II

| Tube Composition | |
|---|---|
| Components | (Parts by Weight) |
| Poly(vinyl chloride) | 100 |
| Diundecyl phthalate | 30 |
| Tribasic lead sulfate | 7 |
| Antimony trioxide | 2 |
| Dibasic lead stearate | 0.4 |

TABLE II-continued

| Tube Composition | |
|---|---|
| Components | (Parts by Weight) |
| N,N'—ethylene bis stearamide | 0.4 |

This tube composition results in a modulus of approximately 230 pounds per square inch at 100° C. when measured using a Rheometric vibromator at a frequency of 1 radian per second. This tube entered a cooling and sizing die approximately 1 second after being extruded. The tube had a wall thickness of approximately 0.015 inch (0.38 millimeter) and had an outer diameter of 0.172 inch (4.37 millimeters). Six units 10 of the above construction were arranged around a central glass-epoxy strength member 201; see FIG. 2. The central strength member (201) had a diameter of 0.104 inch (2.64 millimeters) and had a layer (202) of the above-noted PVC thereon, producing a total outside diameter of 0.175 inch (4.45 millimeters). Around it were arranged the six units (10) as shown. Around the structure was extruded a polyethylene tube (204) having an inside diameter of 0.622 inch (15.8 millimeters) and a thickness of 0.042 inch (1.07 millimeters). A filling gel (203), as described above, was coextruded into the interstices of the core along with this polyethylene core tube. Next, a high-density polyethylene sheath (205) was extruded onto the structure, having twenty-eight helically arranged stainless steel wires (206), each 0.024 inch (0.6 millimeter), embedded therein. This first sheath had a thickness of 0.04 inch (1.02 millimeters). A second high-density polyethylene sheath (207), having twenty-eight stainless steel wires (208) embedded therein, was applied onto the first sheath. The thickness of this second sheath was 0.053 inch (1.35 millimeters), and the stainless steel wires had a helical lay in the opposite direction to those in the first sheath, yielding a torque-balanced design.

Tests performed on the optical fibers in the above structure have shown that the added loss due to the cabling operation was typically about 0 decibels per kilometer, at a wavelength of 1.31 microns, within the experimental error of the test apparatus. Furthermore, the cables were cycled between −40° F. and 190° F. over a period of several days. The mean value of the induced losses due to this temperature excursion was less than 0.1 decibel per kilometer. In fact, at the end of the temperature cycling, added losses were typically only about 0.05 decibel per kilometer. These results show that optical fibers having relatively thin coatings thereon can be cabled with very low additional loss, and protected over expected excursions in operating temperatures, using the inventive unit design.

As noted above, the inventive units can be arranged in different numbers inside sheaths of differing design. Since the losses due to cabling and the temperature excursion-induced losses are substantially determined by the unit design, the present unit design allows a wide variety of sheaths to be applied thereto while retaining the desired performance properties. The sheath design is determined by such factors as desired tensile stiffness, bend radius, fire resistance, rodent protection, and lightning protection. For example, in addition to the above-noted designs having steel strength members located in the sheaths, an entirely dielectric cable can be made using fiberglass strength members in place of the steel wires shown in FIG. 2, 3, and 4. If a fire-retardant cable is desired, a PVC sheath can be used in place of the polyethylene materials shown above. Other variations in sheathing structures will be apparent to those skilled in the art.

The above Example illustrates that the desired performance characteristics can be achieved with the inventive design. However, other materials can be substituted for those noted above. For example, for the buffer layer on the central strength member in FIG. 1, a polyurethane or other relatively soft material can be substituted for the rubber shown. A polyurethane, for example, absorbs relatively less of the oil contained in the filling gel, thus swelling less than the rubber indicated above. This may in some cases prevent tensile strains being imposed upon the optical fiber as the cushion swells over a period of time. I recommend choosing a buffer layer having a modulus of less than 1500 pounds per square inch for a 300 percent elongation. For example, Estane 58300, by the B. F. Goodrich Company, obtains a modulus of 1000 pounds per square inch for a 300 percent elongation, can be pressure-extruded onto the central strength member, and swells significantly less when exposed to the above-noted oil in the filling gel when exposed to the above-noted oil in the filling gel than the Kraton G 7705 used in the Example.

A second area of alternative materials concerns the tube surrounding each unit. For still improved long-term performance, it is desirable to obtain a PVC material that does not rely upon a monomeric plasticizer. This is because typical plasticizers will migrate into the oil in the filling gel after a period of time, resulting in possible embrittlement of the PVC tube. One tube material that results in improved long-term performance is ethylenevinyl acetate (EVA) copolymer grafted onto the PVC; this avoids the use of a monomeric plasticizer. A suitable material is Pantalast 1162 from Pantasote, Incorporated, Passaic, NJ. This material has a specific gravity of 1.28, a shore hardness (C) of 77, and a tensile modulus at 100 percent elongation of 2795 pounds per square inch, and a brittle point of −40° C. (ASTMD 746). This material also obtains a shear modulus after extrusion of 230 pounds per square inch at 100° C. at a frequency of 1 radian per second, measured as above. Still other copolymers and terpolymers of PVC are possible. In choosing a tube material, typically the amorphous polymer materials obtain a lower modulus than materials having a high degree of crystallinity. For example, some low-density polyethylenes and some low-density chlorinated polyethylenes are known to have a relatively low degree of crystallinity and a low modulus under the above conditions. Still other materials are possible.

The optical fibers shown in FIG. 1 are helically laid directly on the buffer layer 12. However, it is also possible to "float" the optical fibers in the waterproofing gel, so as to not be in contact with the buffer layer; see FIG. 3. This provides for increased strain relief for the optical fibers, further minimizing the possibility of fatigue-induced strength loss or optical degradation. It also allows for a desired environmental and tensile load performance. In order to float the optical fibers 13 in the waterproofing gel 14, one method is to apply a differential tensile strain onto the unit central strength member 11 and the optical fibers during the laying of the optical fibers. The optical fibers 13 are initially laid directly in contact with the stressed strength member and buffer layer, so as the stress on the central strength member is substantially released, the central strength member will contract, thereby causing the helically disposed fibers to be pushed out into the filling compound 14. I recommend applying a differential stress sufficient to cause a 0.05 to 0.3 percent greater tensile strain on the central strength member, as compared to the optical fibers, during the laying of the optical fibers onto the buffer layer. It is apparent that the use of the buffer layer is optional, and the present method can be practiced on fibers initially laid directly in contact with the strength member.

Figure 6:
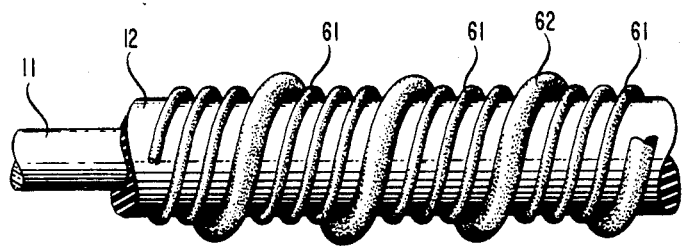
FIGS. 6 and 7 show a spacer cord disposed between the buffer layer and the tube, thereby maintaining clearance for the optical fibers.
Figure 7:
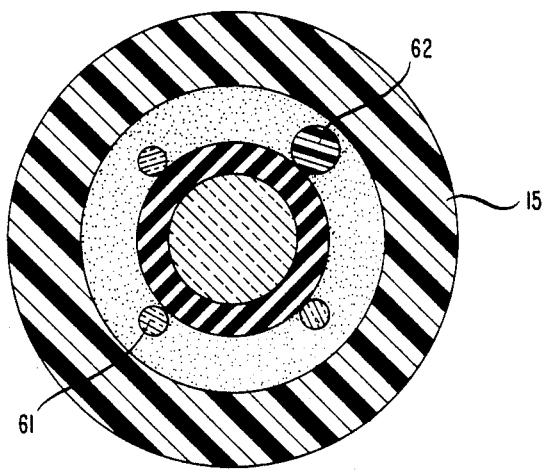

A further inventive embodiment of the present cable provides for the incorporation of a spacer cord between the central strength member and the unit tube. Referring to FIG. 6, for illustrative purposes, three optical fibers 61 are wound around the buffered central strength member (11, 12) as shown. A spacer cord 62 is also helically wrapped thereon, with the spacer cord having a larger diameter than the optical fibers. Referring to FIG. 7, it is seen that the spacer cord 62 provides for clearance between the central strength member and the tube 15. While a single spacer cord is shown, additional spacers can be utilized between the optical fibers. The spacer cord provides for several advantages. Firstly, during cable manufacture, the spacer cord helps to ensure that the tube 15 is concentrically disposed around the central strength member, so that any variations in alignment of the manufacturing equipment do not substantially result in an offset between the central strength member and the tube. Secondly, during installation and service conditions, lateral loads applied to the cable, for example when bending the cable, will not result in a significant off-centering of the central strength member with regard to the tube. Rather, the spacer cord ensures that the fibers remain between the central strength member and the tube, without substantially being pinched therebetween. This is especially desirable for maintaining low microbending losses in the optical fibers. To maintain the all-dielectric nature of the units for lightning protection, a dielectric cord is desirable. In the above-noted cable, I recommend for a spacer cord a fiberglass roving coated with the same material as the polymeric tube. This provides for substantially the same tensile stiffness as a glass optical fiber, and a soft cushion having substantially no shrinkback, to protect the optical fibers. In the above design, I recommend a core having a diameter of about 0.03 inch (0.76 millimeter). Other materials and sizes are possible.

As noted, the present cable design does not require optical fibers having a thick coating layer (as of silicone or other low modulus material) to achieve low loss performance. However, a relatively thick buffer layer can be applied to the coated fiber for convenience of handling the fibers. For example, a 0.0125 inch (0.318 mm) thick layer of poly(vinyl chloride) on the above-noted coated fibers provides for ready splicing and connectorizing of the fibers at terminal locations.

All such uses of the present technique are within the spirit and scope of the present invention.

What is claimed is:

1. A method of making an optical fiber cable by steps comprising helically laying at least one optical fiber around, and in contact with, a strength member CHARACTERIZED IN THAT said strength member is stressed during said laying sufficiently to produce a strain greater than the strain induced in said at least one optical fiber during said laying, and thereafter releasing the strain in said strength member sufficiently to move said at least one optical fiber out of contact with said strength member.

2. The method of claim 1 wherein the strain in said strength member is in the range of from 0.05 to 0.3 percent greater than the strain in said at least one optical fiber during said laying.

3. The method of claim 1 wherein said strength member comprises fiberglass in a polymeric matrix material.

4. The method of claim 1 wherein said strength member includes a substantially smooth buffer layer that provides said contact with said at least one optical fiber during said laying.

5. An optical fiber cable comprising at least one unit CHARACTERIZED IN THAT said unit comprises a longitudinal strength member and at least one optical fiber helically disposed around said member, and further comprises a tube disposed around said at least one optical fiber, and still further comprises a spacer cord having a diameter larger than said at least one optical fiber and being helically disposed around said strength member, thereby substantially preventing contact between said at least one optical fiber and said tube.

6. The cable of claim 5 wherein said strength member includes a substantially smooth buffer layer.

7. The cable of claim 6 wherein said at least one optical fiber is in contact with said buffer layer.

8. The cable of claim 6 wherein said at least one optical fiber is not in contact with said buffer layer.

9. The cable of claim 1 wherein said tube is formed of a material having a shear modulus of less than 500 pounds per square inch at a temperature of 100° C. as measured at a frequency of 1 radian per second.

10. The cable of claim 1 wherein said tube substantially comprises poly(vinyl chloride).

11. The cable of claim 1 wherein said tube substantially comprises a copolymer of poly(vinyl chloride).

12. The cable of claim 1 wherein said tube substantially comprises a terpolymer of poly(vinyl chloride).

13. The cable of claim 1 wherein said tube comprises ethylenevinyl acetate and poly(vinyl chloride)

14. The cable of claim 1 wherein said tube substantially comprises amorphous material.

15. The cable of claim 1 wherein said at least one optical fiber has a coating thickness of less than 0.005 inch.

16. The cable of claim 1 wherein said spacer cord is a dielectric.

17. The cable of claim 1 wherein said longitudinal strength member is a dielectric.

18. The cable of claim 1 wherein said longitudinal strength member comprises fiberglass.

19. The cable of claim 1 having interstices within said tube that are substantially filled with a waterproofing material having a modulus of less than 5 pounds per square inch over a temperature range of −40° F. to 170° F.

20. The cable of claim 1 wherein said cable comprises a multiplicity of units within a sheath.

* * * * *